United States Patent
Mohr et al.

(10) Patent No.: US 6,443,448 B1
(45) Date of Patent: Sep. 3, 2002

(54) SPEED CHANGING DEVICE

(75) Inventors: Keven Mohr; Armin Zimmermann, both of Constance (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/555,627

(22) PCT Filed: Nov. 13, 1998

(86) PCT No.: PCT/DE98/03345

§ 371 (c)(1),
(2), (4) Date: Jun. 2, 2000

(87) PCT Pub. No.: WO99/28054

PCT Pub. Date: Jun. 10, 1999

(30) Foreign Application Priority Data

Dec. 2, 1997 (DE) .......................... 197 53 419

(51) Int. Cl.⁷ ................................ B65H 5/34
(52) U.S. Cl. ...................... 271/270; 271/272; 271/273; 271/203; 271/176; 271/202; 271/265.02; 198/460.1
(58) Field of Search ................ 271/270, 272, 271/273, 275, 202, 203, 176, 265.02; 198/460.1

(56) References Cited

U.S. PATENT DOCUMENTS

| | | | |
|---|---|---|---|
| 3,532,338 A | * 10/1970 | Brinsor et al. | .............. 271/273 |
| 4,451,027 A | * 5/1984 | Alpar | .......................... 271/270 |
| 4,541,624 A | 9/1985 | Sasage et al. | |
| 4,717,013 A | 1/1988 | Reissmann et al. | |
| 5,011,127 A | * 4/1991 | Holbrook | ..................... 271/273 |
| 5,129,641 A | * 7/1992 | Long | .......................... 271/270 |
| 5,536,001 A | * 7/1996 | Lange | ........................ 271/202 |
| 5,664,771 A | * 9/1997 | Nagatani et al. | ....... 271/265.02 |

FOREIGN PATENT DOCUMENTS

| | | | | |
|---|---|---|---|---|
| DE | 1 288 017 | | 1/1969 | |
| DE | 25 44 499 | | 4/1977 | |
| JP | 406127748 A | * | 5/1994 | .................. 271/270 |

\* cited by examiner

Primary Examiner—H. Grant Skaggs
(74) Attorney, Agent, or Firm—Venable; Catherine M. Voorhees

(57) ABSTRACT

The invention relates to a device to change the speed of individual flat shipments that are jammed and displaced one behind the other on a two-part conveyance system. In order to carry out any desired speed changes, without subjecting the shipments to pull or strain, a first conveyance device is located in front of a second conveyance device with controllable speed. The first conveyance device is normally driven at the speed of the inputting part of the conveyance system and does not exert a propelling or braking effect on the relevant delivery when it is blocked on the second conveyance device with controllable speed.

7 Claims, 3 Drawing Sheets

FIG 2
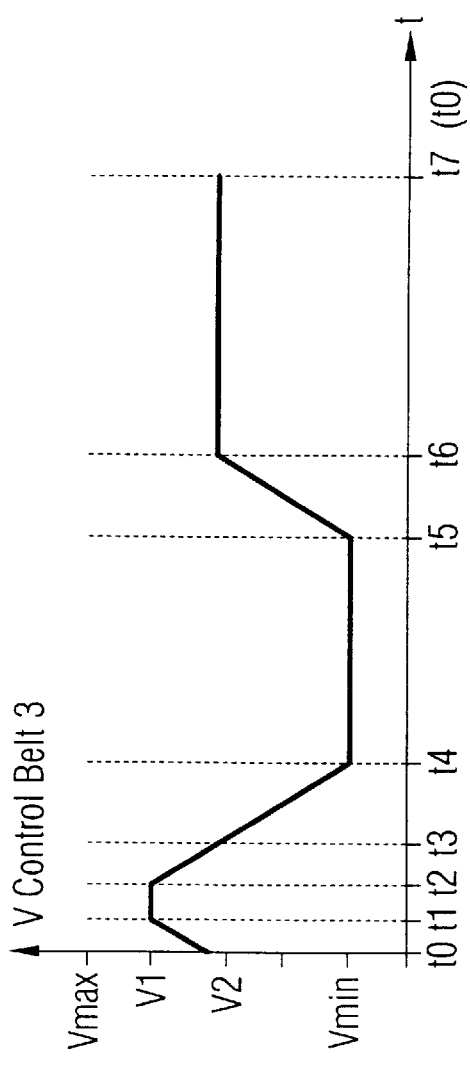
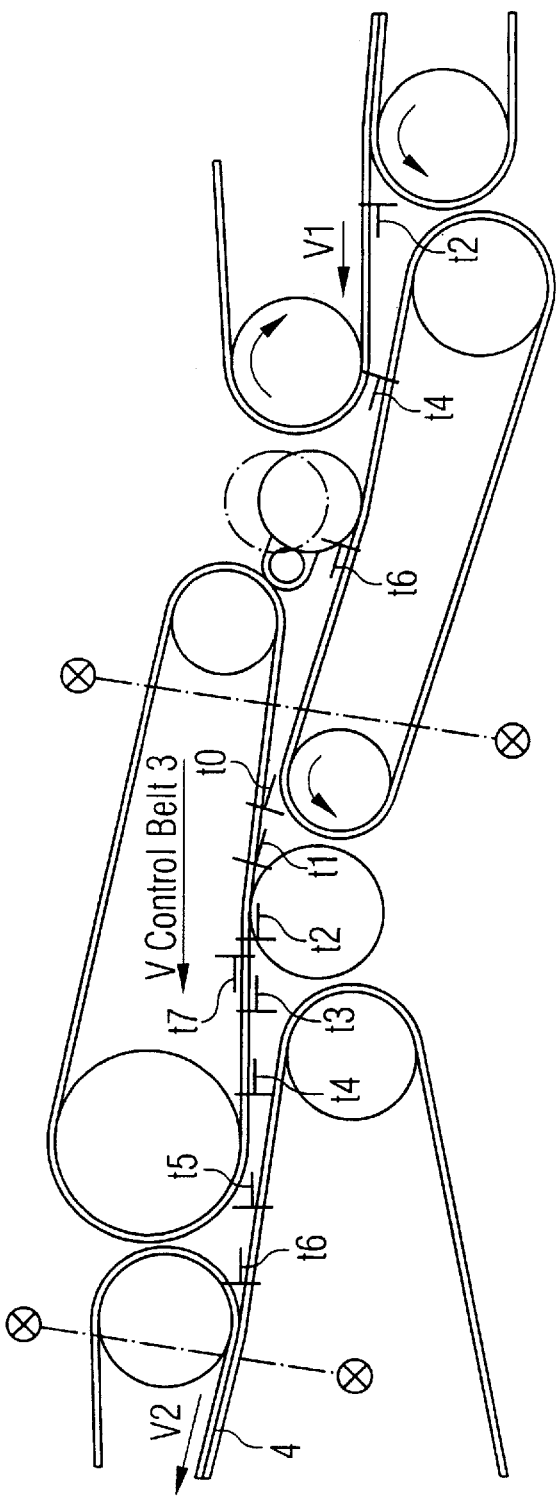

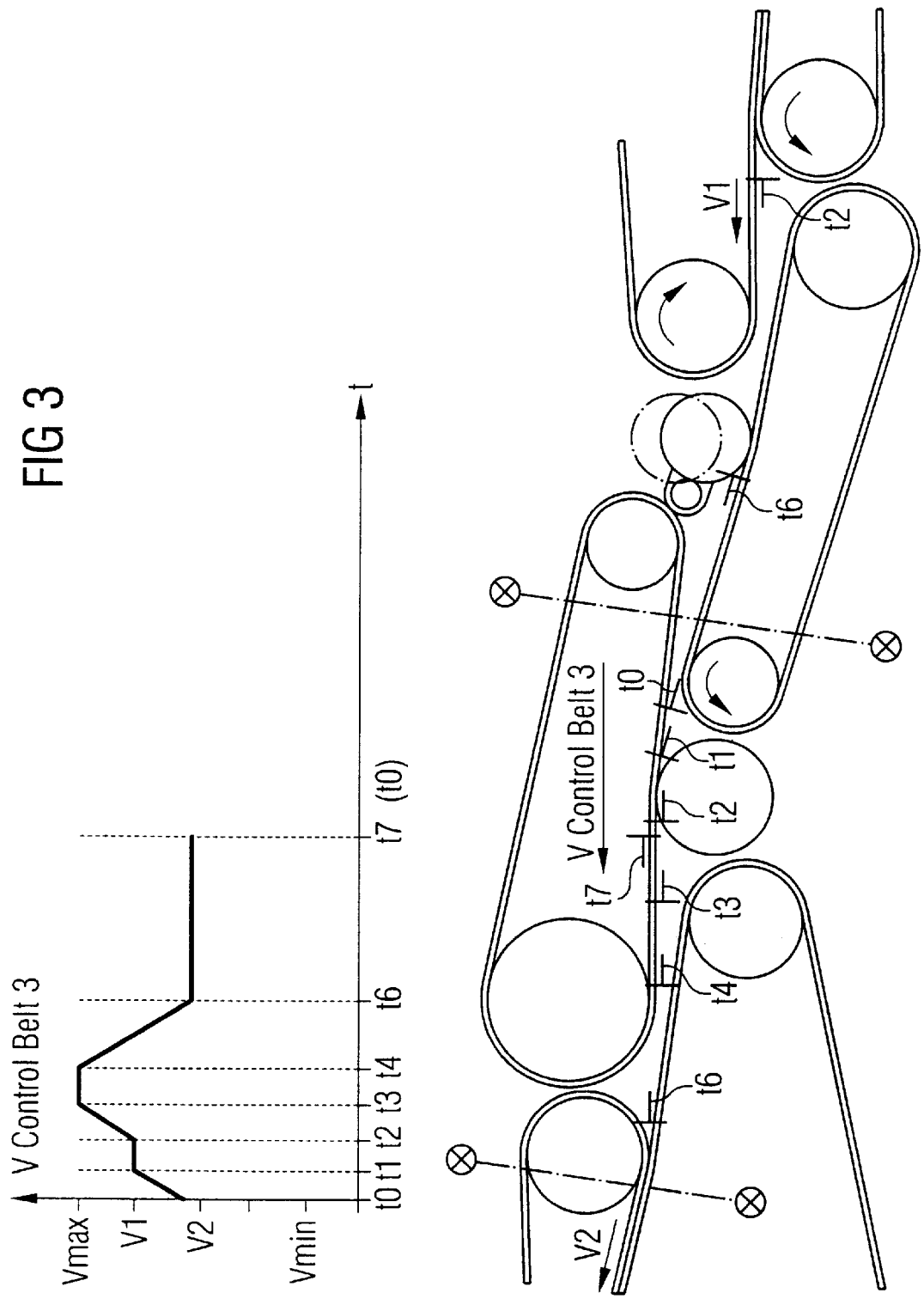

SPEED CHANGING DEVICE

BACKGROUND OF THE INVENTION

The invention relates to a transport system for flat shipments, having a feeding part and a discharge part, in which the separated shipments are transported in clamped fashion, and a transport device of controllable speed, disposed between the two parts.

Particularly in distribution systems, the shipments are transported at high speeds and with minimal spacings therebetween as individual shipments are clamped between endless guide belts. Since the gaps between the shipments can differ because of shifting during transportation or because of doffing errors on being separated, correction of the gaps is necessary if the high performance and operation with little malfunction is to be maintained. If the shipments are to be transported at different speeds in the distributor machine, then when the speeds are changed, the gaps must absolutely be corrected if constant spacings between shipments are to be assured. That is, if the speed is increased or reduced, then correspondingly the spacings between the shipments are increased or decreased.

Versions have become known in which to increase the transport speed, two guide belt systems are disposed one after another, of which the rear system in terms of the transport direction transports at higher speed. Because of the abrupt change in speed at the transition point, the shipments are subjected to tensile stress. This increases the gaps, as a function of the shipment length and the various friction conditions between the shipments and the different guide belts.

For gap correction, the shipments are accelerated and braked again by means of pairs of rollers driven in a controlled fashion, so that they are displaced forward. Once again, the result is tensile stress on the shipments.

A synchronizing device for high-speed flat products to be conveyed is known (German Published, Examined Patent Application DE-AS 1 288 017), in which the products to be transported are delivered by a conveyor belt system to an intermediate belt segment and are discharged with a further conveyor belt system. The intermediate belt segment has a variable-speed drive mechanism, with which shifting, among the conveyed products relative to one another, or in other words shifting of gaps, is corrected in such a way that the products being conveyed can be delivered with fixed spacing to a mail distributing machine. Since the pieces of mail, or letters, are always in the lead, a targeted relative shift to the rear is effected on the intermediate belt segment. For reasons dictated by the process, this intermediate belt segment is relatively long. Since only one shipment at a time can be located on this long segment, necessarily wide gaps occur between the letters. If large and small letters one after another with comparatively small gaps are needed, then this object can be attained with this system.

SUMMARY OF THE INVENTION

The object of the invention is therefore to create a transport system for changing the speed of shipments of various lengths that are transported individually and in succession with small gaps therebetween between them, and in a clamped fashion where arbitrary changes can be made without tensile or compressive stresses on the shipments.

By using a transport device which is upstream of the transport device that has the controllable drive mechanism and which does not hinder the accelerating transport of the shipments by the second transport device, no stresses are put on the shipments upon acceleration or braking, since in this period of time, the drive of the shipments is effected only by the transport device having the controllable drive mechanism.

With a view to a simple design, it is especially advantageous to embody the first transport device with a clamping point that can be engaged and disengaged.

It is also advantageous according to the invention to make the drive mechanism of the first transport device capable of being coupled and uncoupled.

In a further advantageous feature in accordance with the invention, the first transport device has a controllable drive, which, while the applicable shipment is clamped in the second transport device, is driven at the same speed as the second transparent device.

To reduce the switching operations of the drive of the first transport device, in an advantageous embodiment of the invention, this drive has a free-wheeling mechanism.

If the shipment in the second transport device is driven at a higher speed than in the first transport device, in which the shipment is still clamped, then the shipment can be transported with very little stress at the higher speed, since the free-wheeling mechanism makes the first transport device run at this speed as well.

For correcting gaps, the speed is advantageously changed in two acceleration phases in accordance with the invention. In the first phase, the applicable shipment is assigned a positive or negative acceleration, depending on the necessary displacement direction, and in the second phase, an adaptation to the speed of the downstream part of the transport system is made. The acceleration times and levels are defined in such a way that taking into account the available time and the length of the correction path, the necessary displacement is ended upon the transfer of the shipment to the downstream part of the transport system, and for the sake of handling the shipments gently, the accelerations are kept as slight as possible.

In an advantageous embodiment according to the invention, the correction path is made long enough that a maximum acceleration is not exceeded when the corrections are made.

BRIEF DESCRIPTION OF THE DRAWINGS

The invention is described in further detail below in terms of an exemplary embodiment in conjunction with the drawings in which;

FIG. 2 is a plan view showing the speed course upon displacement rearward in the shipment stream; and FIG. 3 is a plan view showing the speed course upon displacement forward in the shipment stream.

DETAILED DESCRIPTION OF THE INVENTION

Figure 1:
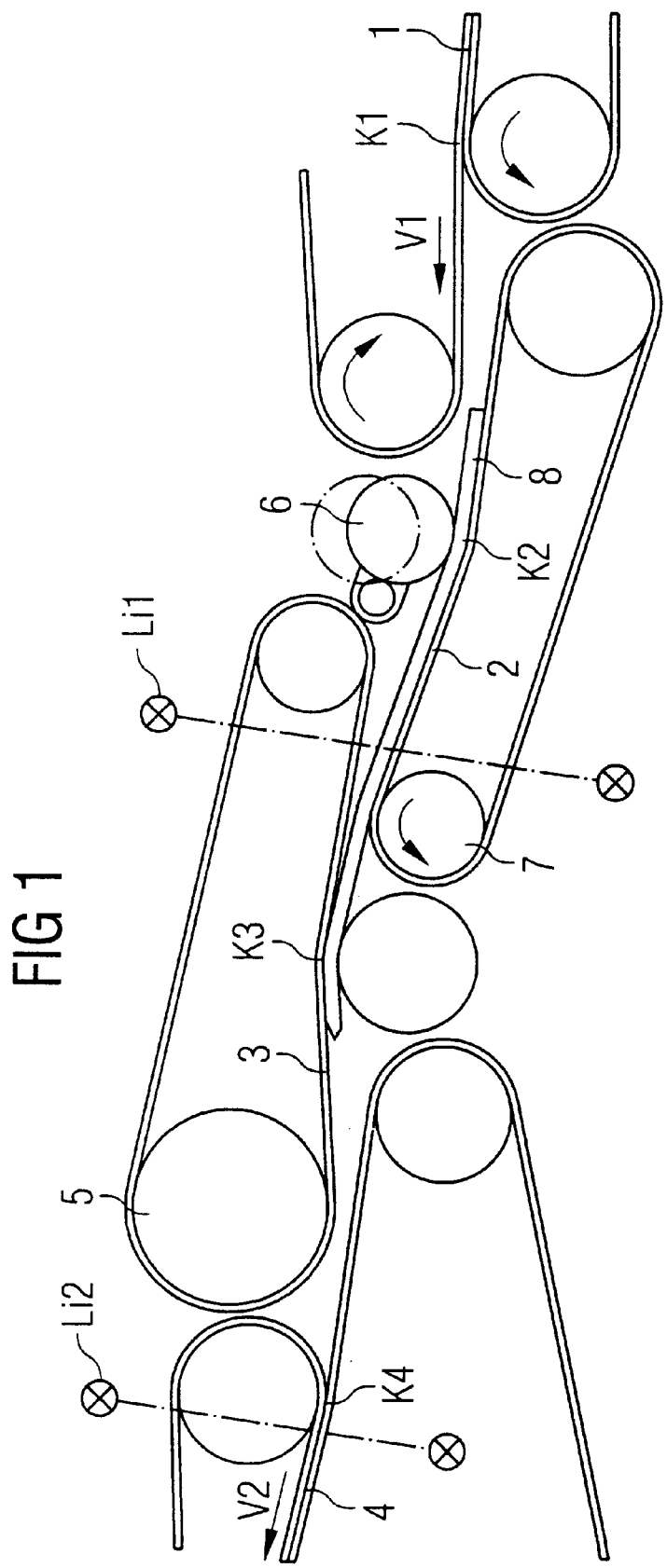
FIG. 1 is a plan view of a correction apparatus according the invention.

The shipments 8 are transported in a first feeding part of a transport system, comprising endless guide belts 1 travelling at the speed V1 over deflection rollers, between which belts the shipments are clamped, separated with gaps between them and in succession to the correction apparatus, and then taken over by a second part of the transport system, also comprising two guide belts 4 running in contact with one another and transported onward at the speed V2.

The speed V2 can be greater than, less than or equal to the speed V1.

In this example, the speed V2<V1; that is, if a gap has to be corrected, even a negative sudden change in speed must be made. The deflection rollers of the transferring parts and the receiving parts of the transport system are displaced relative to one another, as shown in FIG. 1, in such a way that parts of a first and second transport device of the correction apparatus protrude into the parts of the transport system. This prevents major gaps that interfere with the course of shipment. The first transport device includes an endless intermediate belt 2, guided over two deflection rollers, that with its part receiving the shipments extends as far as the rear (or bottom, as seen from above) deflection of the feeding part of the transport system.

The second deflection roller 7, driven at the speed V1, is oriented in the direction of the second part of the transport system. Next to the front deflection roller of the first part of the transport system, approximately in the middle between the deflection rollers of the first transport device, there is a pivot roller 6, which is pivoted inward in controlled fashion and thus presses against the intermediate belt 2 and is pivoted away from the intermediate belt 2. Thus at this clamping point K2, the clasping of the transported shipments can be engaged and disengaged. Next to the pivot roller 6 of the first transport device is a nondriven deflection roller, by way of which a control belt 3 of the downstream second transport device is guided. The second deflection roller 5, driven by a servomotor for briefly accelerating and braking the shipments, is disposed in terms of the transport direction next to the rear, trailing deflection roller of the discharging second part of the transport system.

Between the driven deflection roller 7 of the first transport device and the leading, receiving deflection roller of the guide belts 4 of the discharge part of the transport system, there is a locally fixed ejector roller, which presses constantly against the control belt 3 and thus forms a locally fixed clamping point K3 for the shipments 8. The spacings of the clamping points K2 and K3 from one another and from the extreme clamping points K1 and K4 of the delivery discharge parts of the transport system are greater than the length of the shortest shipment 8, so that the shipments are constantly clamped during transport. The spacing between the clamping points K1 and K3 is greater than the length of the longest shipment, thus assuring that the longest shipment has left the feeding part of the transport system on being clamped at the clamping point K3. A light gate Li1 is located in front of the clamping point K3 and is connected to the drive controller for the deflection roller 5. If the front edge of a shipment 8 is recorded in the light gate Li1, then the deflection roller 5 is accelerated by the control belt 3 at the instant when the speed V1 is attained when the shipment 8 is clamped at point K3. The further course of the speed depends on the measured, and possibly to be corrected, spacings of the shipments and on the lengths of the shipments. In this exemplary embodiment, before transfer of the applicable shipment, the following data are ascertained by the apparatus for speed changing:

1. Gap upstream of the shipment, with calculation of a possible correction of the position of the preceding shipment;
2. Shipment length
3. Gap downstream of the shipment It is advantageous, but not absolutely necessary, also to ascertain the length of the next shipment. A correction strategy has been chosen in which the front and rear gap are equalized as much as possible, which does not restrict the capability of shifting the next shipment forward. This is because the gap conditions downstream of the next shipment are unknown, and it may become necessary to shift this shipment forward to a maximum extent, so that the gaps are never below a specified minimum.

This measurement is done by means of a further light gate, not shown and located farther forward, which is placed far enough forward that the results are available soon enough to make a correction. A further light gate Li2, located at the clamping point K4, is used to check the spacings of the shipments after they have left the correction apparatus. If any deviations from the desired point should still exist (for instance from slippage in the case of especially heavy shipments), then additional corrections are made while the shipments are still located in front the correction apparatus. The process of shipment displacement will be explained below in conjunction with FIGS. 2 and 3, which also show the speed courses.

Shifting a shipment to the rear (FIG. 2):

If the front edge of the shipment 8 to be shifted is located at position t0, shortly before the clamping point K3 of the control belt 3, then the control belt 3 is accelerated to the speed V1, so that the shipment 8 that is still engaged in the guide belts 1 or on the intermediate belt 2 at the speed V1, will be taken over without compression at position t1.

If the front edge of the shipment 8 to be shifted is located at position t2, then the shipment 8 is securely engaged at the clamping point K3, and the control belt 3 can be braked down to the minimum speed V min, and as a result the shipment 8 is shifted relatively rearward by the previously calculated value compared with the preceding shipment and the next shipment. Once the shipment 8, via positions t3 and t4, has reached position t5, the control belt 3 has to be accelerated to the speed V2, so that the shipment 8 at position t6 has the speed V2, so that it can be taken over from the guide belts 4 without tension. Until the rear edge of the shipment has reached position t7, where it is no longer clamped in the control belt 3, the speed V2 must be maintained, in order to prevent tensile stresses on the shipment 8.

At the same time, the next shipment can have reached position t0, and a new period can begin.

The result is the minimum gap, including between position t7 of the rear edge of a shipment, and position t0 of the front edge of the next shipment.

Since the rear edge of a long shipment 8, on reaching position t2, is still clamped to the intermediate belt 2, which travels at the speed V1, the shipment would be compressed between the clamping points K2 and K3. Accordingly, once position t2 is reached, the pivot roller 6 is put out of engagement, thus undoing the clamping at K2. Not until the rear edge of the shipment at position t6 has passed the clamping point K2 is the pivot roller 6 put back into operation, so that the next shipment can be taken over. An alternative for the pivot roller would for instance be to decouple the drive of the intermediate belt system 2, or to embody the intermediate belt system 2 as a second control belt system.

Shifting a shipment forward (FIG. 3):

If the front edge of the shipment 8 to be shifted is located at position t0, shortly before the clamping point K3 of the control belt 3, the control belt 3 is accelerated to the speed V1, so that the shipment 8, which is still engaged in the guide belts 1 or on the intermediate belt 2 at the speed V1, can be taken over without compression at position t1.

If the front edge of the shipment 8 to be shifted is located at position t2, the shipment is reliably engaged at the clamping point K3, and the control belt 3 can be accelerated to the maximum speed V max., and as a result the shipment 8 is shifted relatively forward by the previously calculated value compared to the shipment in the lead and the next shipment. If the shipment 8, via position t3 has reached position t4, the control belt 3 must be braked to the speed V2, so that the shipment 8 at position t6 has the speed V2, so that it can be taken over without compression from the guide belts 4. Until the rear edge of the shipment has reached position t7, where it is no longer clamped on the control belt 3, the speed V2 must be maintained, to prevent compressions of the shipment 8.

At the same instant, the next shipment can have reached position t0, and a new period can begin.

Since the rear edge of a long shipment 8, when it reaches position t2, is still clamped to the intermediate belt 2, which travels at the speed V1, the shipment would be subjected to tension between the clamping points K2 and K3, with the consequence that the shipment 8 would not follow the speed of the control belt 3, and correction errors would occur.

Therefore when position t2 is reached, the pivot roller 6 is put out of engagement, thus undoing the clamping at K2 When the rear edge of the shipment reaches position t6, the pivot roller 6 is put back into operation. To reduce the frequency of switching of the pivot roller 6, the drive roller 7 of the intermediate belt 2 can be equipped with a free-wheeling mechanism, and as a result, with minimum tensile stress on the shipment 8, the intermediate belt 2 follows the acceleration of the control belt 3, despite the drive of the intermediate belt 2 by the central drive.

What is claimed is:

1. A transport system for transporting flat shipments of a length in a clamped manner comprising:

a delivery part, driven at a first speed, that feeds separated shipments to a first transport device, said delivery part having a last delivery clamping point disposed adjacent said first transport device;

said first transport device having a drive and a first clamping point, said first transport device moving individual, separated shipments in succession to a second transport device;

said second transport device having a variable drive and a second clamping point which receives the individual, separated shipments from said first transport device, the variable drive of said second transport being independent from the drive of the first transport device, the second clamping point being spaced a distance from the last delivery clamping point so that the distance is greater than the length of the longest shipment; and a discharge part, driven at a second speed, having a discharge clamping point that receives the separated shipments from said second transport device where the first and second transport devices are disposed between said delivery and discharge parts in succession and adjacent clamping points are spaced from one another a distance that is less than the length of the shortest shipment;

wherein said first transport device is driven at the first speed of said delivery part until such time as a respective shipment is clamped by said second transport device at the second clamping point so that said first transport device does not exert a driving or braking action of the respective shipment, and wherein once the respective shipment has left said first transport device, the first transport device is again driven at the first speed of the delivery device and said second transport device is driven at a variable speed which is changed when the respective shipment is transferred to said discharge part so that the respective shipment has a speed equal to the second speed of said discharge part which is maintained until a rear edge of the respective shipment has left said second transport device, and after the respective shipment has left said second transport device, said second transport assumes the first speed of the delivery part.

2. The transport system of claim 1, wherein the first clamping point can be engaged and disengaged.

3. The transport system of claim 1, wherein the drive of the first transport device can be coupled and uncoupled.

4. The transport system of claim 1 wherein the drive of the first transport device controllable, which, while the applicable shipment is clamped in the second transport device, is driven at the same speed as the second transport device.

5. The transport system of claim 1, wherein the drive of the first transport device has a free-wheeling mechanism.

6. The transport system of claim 1, wherein the speed change of the second transport device for gap correction is effected with two acceleration phases, and in the first acceleration phase the engaged shipment is given a positive or negative acceleration in accordance with the difference between the spacings between shipments, measured by a measuring instrument, and the desired spacing, and in the second acceleration phase, the speed of the engaged shipment is adapted to the speed of the second discharge part of the transport system.

7. The transport system of claim 1, wherein the spacing between the second clamping point of the second transport device and the discharge clamping point of the discharge part of the transport system is of a great distance so that acceleration distances for the respective speed changes are achieved while maintaining a maximum acceleration.

* * * * *